(12) United States Patent
Schuette et al.

(10) Patent No.: US 9,317,715 B2
(45) Date of Patent: Apr. 19, 2016

(54) DATA PROTECTION COMPLIANT DELETION OF PERSONALLY IDENTIFIABLE INFORMATION

(75) Inventors: Mark T. Schuette, Wiesloch (DE); Juergen Schneider, Otterstadt (DE); Paul El Khoury, Heidelberg (DE)

(73) Assignee: SAP SE, Walldorf (DE)

( * ) Notice: Subject to any disclaimer, the term of this patent is extended or adjusted under 35 U.S.C. 154(b) by 582 days.

(21) Appl. No.: 13/594,158

(22) Filed: Aug. 24, 2012

(65) Prior Publication Data

US 2014/0059355 A1     Feb. 27, 2014

(51) Int. Cl.
*H04L 29/06*     (2006.01)
*G06F 21/62*     (2013.01)

(52) U.S. Cl.
CPC ........ *G06F 21/6254* (2013.01); *G06F 21/6218* (2013.01); *G06F 2221/2143* (2013.01)

(58) Field of Classification Search
USPC .......................................................... 713/189
See application file for complete search history.

(56) References Cited

U.S. PATENT DOCUMENTS

| | | | |
|---|---|---|---|
| 4,640,594 A | 2/1987 | Berger | |
| 6,947,556 B1 * | 9/2005 | Matyas, Jr. .......... | G06F 21/6209 380/281 |
| 7,490,347 B1 | 2/2009 | Schneider et al. | |
| 7,894,602 B2 | 2/2011 | Mueller et al. | |
| 8,140,866 B2 | 3/2012 | Becker et al. | |
| 8,370,648 B1 * | 2/2013 | Natanzon .............. | H04L 63/068 380/277 |
| 2002/0010784 A1 * | 1/2002 | Clayton .............. | G06F 21/6245 709/229 |
| 2004/0187012 A1 * | 9/2004 | Kohiyama .......... | G06F 11/1458 713/193 |
| 2005/0105719 A1 * | 5/2005 | Hada ................... | G06F 21/6245 380/28 |
| 2007/0100913 A1 * | 5/2007 | Sumner ............... | G06F 11/1453 |
| 2007/0239615 A1 * | 10/2007 | Matsuzaki ........ | G06K 19/07749 705/55 |
| 2008/0181406 A1 * | 7/2008 | Iyer et al. ....................... | 380/277 |
| 2009/0025068 A1 | 1/2009 | Benameur et al. | |
| 2009/0044271 A1 | 2/2009 | Benameur et al. | |
| 2009/0092252 A1 * | 4/2009 | Noll ........................ | H04L 9/083 380/277 |
| 2009/0249358 A1 | 10/2009 | Schuette | |
| 2010/0061552 A1 | 3/2010 | Becker et al. | |
| 2010/0082993 A1 * | 4/2010 | Benameur ............ | H04L 9/3247 713/176 |
| 2010/0290623 A1 * | 11/2010 | Banks ................. | G06F 21/6227 380/277 |
| 2012/0030180 A1 | 2/2012 | Klevenz et al. | |
| 2013/0159699 A1 * | 6/2013 | Torkkel ................. | H04L 9/0897 713/155 |

OTHER PUBLICATIONS

Churches, Tim, and Peter Christen. "Some methods for blindfolded record linkage." BMC Medical Informatics and Decision Making 4.1 (2004): 9.*

(Continued)

*Primary Examiner* — Harris C Wang
(74) *Attorney, Agent, or Firm* — Fish & Richardson P.C.

(57) ABSTRACT

The disclosure generally describes computer-implemented methods, software, and systems for modeling and deploying decision services. One computer-implemented method includes encrypting, by operation of a computer, personally-identifiable information (PII) data using a first cryptographic key, wherein the PII data is associated with non-encrypted associated data, encrypting the encrypted first cryptographic key with a second cryptographic key, determining that the occurrence of a PII data disassociation event associated with the second cryptographic key has occurred, and rendering the PII data inaccessible by disassociating the second cryptographic key from the encrypted first cryptographic key.

22 Claims, 3 Drawing Sheets

(56) References Cited

OTHER PUBLICATIONS

Onion routing, http://en.wikipedia.org/w/index.php?title=Onion_routing&oldid=506192339 (last visited Aug. 24, 2012).

S. G. Akl and P. D. Taylor. Cryptographic solution to a problem of access control in a hierarchy. ACM Trans. Comput. Syst. 1(3) (1983), 239-248.

M. J. Atallah, M. Blanton, and K. B. Frikken. Incorporating temporal capabilities in existing key management schemes. In ESORICS, 2007, pp. 515-530.

M.-H.-Y. Chien. Efficient time-bound hierarchical key assignment scheme. IEEE Transactions on Knowledge and Data Engineering 16(10) (2004), 1301-1304.

W. Tolone, G.-J. Ahn, T. Pai, and S.-P. Hong. Access control in collaborative systems. ACM Comput. Surv. 37(1) (2005), 29-41.

* cited by examiner

CRYPTOGRAPHIC KEY RECORDS 200

| PURPOSE 116a | KEY ID 116b | KEY 116c | CONDITION 116d |
|---|---|---|---|
| CUSTOMER SIGNED OFF | $K_{Purpose1}$ | 1000111010110... | TerminationDateReached |
| CUSTOMER SIGNED OFF | $K_{Purpose2}$ | 0111000101010... | TerminationDateReached |
| ⋮ | ⋮ | ⋮ | ⋮ |
| PURCHASE TAX HISTORY | $K_{Purpose3}$ | 1100100110110... | AFTER FIVE YEARS |
| PURCHASE TAX HISTORY | $K_{PurposeN}$ | 1001010010101... | AFTER THREE YEARS |

FIG. 2

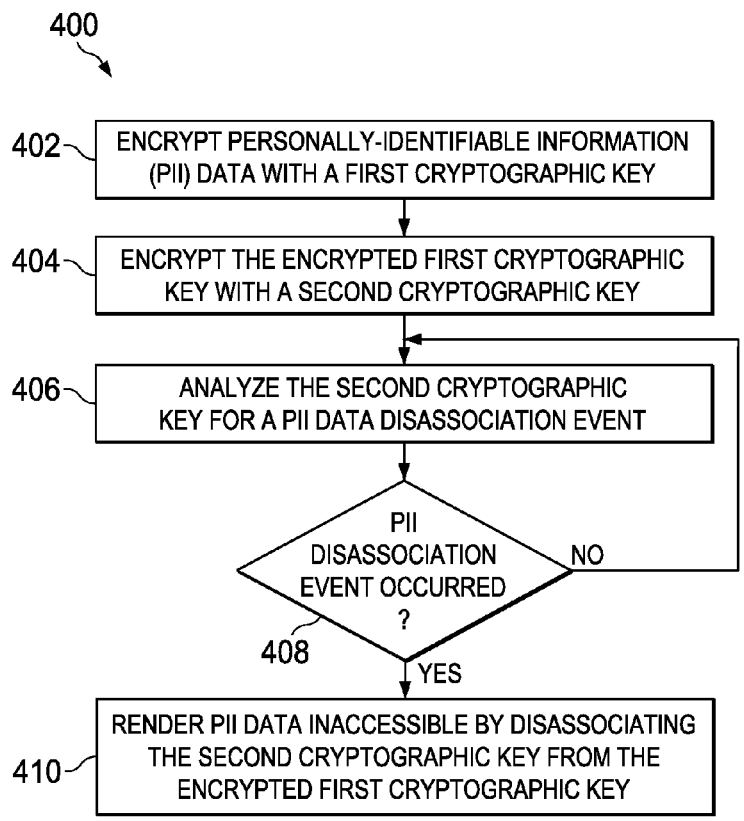

FIG. 4

402 — ENCRYPT PERSONALLY-IDENTIFIABLE INFORMATION (PII) DATA WITH A FIRST CRYPTOGRAPHIC KEY

404 — ENCRYPT THE ENCRYPTED FIRST CRYPTOGRAPHIC KEY WITH A SECOND CRYPTOGRAPHIC KEY

406 — ANALYZE THE SECOND CRYPTOGRAPHIC KEY FOR A PII DATA DISASSOCIATION EVENT

408 — PII DISASSOCIATION EVENT OCCURRED?

410 — RENDER PII DATA INACCESSIBLE BY DISASSOCIATING THE SECOND CRYPTOGRAPHIC KEY FROM THE ENCRYPTED FIRST CRYPTOGRAPHIC KEY

FIG. 3A

DATA RECORDS 300

| | DATA | | KEY ENCRYPTION PER PURPOSE KEY | | | |
|---|---|---|---|---|---|---|
| 302a | | ASSOCIATED DATA (118b) | $E_{KPurpose1}(KRecord1)$ (118d) | $E_{KPurpose2}(KRecord1)$ | ... | $E_{KPurposeN}(KRecord1)$ |
| RECORD 1 | $E_{KRecord1}(PII\ DATA)$ (118a) | ... | ... (118c) | ... 304 | ... | ... 306a |
| ... | | | | | | |
| RECORD N | $E_{KRecordN}(PII\ DATA)$ | ASSOCIATED DATA | $E_{KPurpose1}(KRecordN)$ | $E_{KPurpose2}(KRecordN)$ | ... | $E_{KPurposeN}(KRecordN)$ |

FIG. 3B

DATA RECORDS 300

| | DATA | | KEY ENCRYPTION PER PURPOSE KEY | | | | | |
|---|---|---|---|---|---|---|---|---|
| | | | $E_1$ | $E_2$ | $E_3$ | ... | $E_N$ | |
| 302b | | ASSOCIATED DATA (118b) | $E_{KPurpose1}(KRecord1)$ (118d) | $E_{KPurpose2}(E_1)$ 304b | $E_{KPurpose3}(E_2)$ 306b | ... | $E_{KPurposeN}(E_{N-1})$ 308b | |
| RECORD 1 | $E_{KRecord1}(PII\ DATA)$ (118a) | ... | ... (118c) | ... | ... | ... | ... | |
| ... | | | | | | | | |
| RECORD N | $E_{KRecordN}(PII\ DATA)$ | ASSOCIATED DATA | $E_{KPurpose1}(KRecordN)$ | $E_{KPurpose2}(E_{N1})$ | $E_{KPurpose3}(E_{N2})$ | ... | $E_{KPurposeN}(E_{NN-1})$ | |

DATA PROTECTION COMPLIANT DELETION OF PERSONALLY IDENTIFIABLE INFORMATION

BACKGROUND

Data privacy laws specify that personally identifiable information (PII) data associated with an individual must be destroyed after a purpose for retaining it has expired. These laws vary across geo-political boundaries. Customers also demand privacy and security regarding their PII data. For many organizations, the PII data is distributed across multiple systems and storage locations, possibly across geo-political boundaries subject to varying data privacy laws. Once it is determined that PII data must be destroyed, locating and deleting the PII data can be problematic. Locating the distributed PII data is often a time consuming and error-prone task. Ensuring the deletion of the located PII data may be technically challenging due to various storage formats and methods used to store and transfer the PII data. These challenges affect the organizations' ability to both comply with applicable data privacy laws and to reassure customers of data privacy and security.

SUMMARY

The present disclosure relates to computer-implemented methods, software, and systems for data-protection-compliant deletion of personally identifiable information. One computer-implemented method includes encrypting, by operation of a computer, personally-identifiable information (PII) data using a first cryptographic key, wherein the PII data is associated with non-encrypted associated data, encrypting the encrypted first cryptographic key with a second cryptographic key, determining that the occurrence of a PII data disassociation event associated with the second cryptographic key has occurred, and rendering the PII data inaccessible by disassociating the second cryptographic key from the encrypted first cryptographic key.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by a data processing apparatus, cause the apparatus to perform the actions.

The foregoing and other implementations can each optionally include one or more of the following features:

A first aspect, combinable with the general implementation, further comprising analyzing the second cryptographic key using at least one of a condition associated with the second cryptographic key or a decision rule.

In a second aspect, combinable with any of the previous aspects, the PII data disassociation event includes at least one of exceeding a chronological retention period deadline, a security alert, or a PII data destruction request.

In a third aspect, combinable with any of the previous aspects, the disassociation of the second cryptographic key from the first cryptographic key is performed by at least one of permanently erasing the second cryptographic key, expiring the second cryptographic key, or encrypting the second cryptographic key with a third cryptographic key.

In a fourth aspect, combinable with any of the previous aspects, the second cryptographic key expires based on a chronological value.

In a fifth aspect, combinable with any of the previous aspects, the second cryptographic key expires based on a data value.

In a sixth aspect, combinable with any of the previous aspects, the disassociation of the second cryptographic key from the encrypted first cryptographic key preserves a referential integrity between the encrypted PII data and the non-encrypted associated data.

The subject matter described in this specification can be implemented in particular implementations so as to realize one or more of the following advantages. First, instead of physically deleting personally identifiable information (PII) data associated with an individual, a cryptographic key encrypting the PII data may be deleted, encrypted, or otherwise made economically and/or computationally infeasible to recover in order to ensure data-protection-compliant deletion of the PII data. Second, there is no need to search multiple storage locations for the PII data as deleting the cryptographic key encrypting PII data ensures that the PII data is unusable regardless of storage location. Third, referential integrity between the encrypted PII data and associated non-encrypted associated data is preserved. Fourth, encrypted PII data may be securely distributed and controlled using cryptographic keys. Fifth, introduction of a purpose driven cryptographic operation on PII data (e.g., each purpose is associated with a unique cryptographic key) could help prioritize operations related to retention and/or deletion of encrypted PII data.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 2 is a block diagram illustrating components of cryptographic key records.

FIG. 3A is a block diagram illustrating components of a data record.

FIG. 3B is a block diagram illustrating components of an alternative data record.

FIG. 4 is a flow chart for data-protection-compliant deletion of personally identifiable information data.

Like reference numbers and designations in the various drawings indicate like elements.

DETAILED DESCRIPTION

Figure 1:
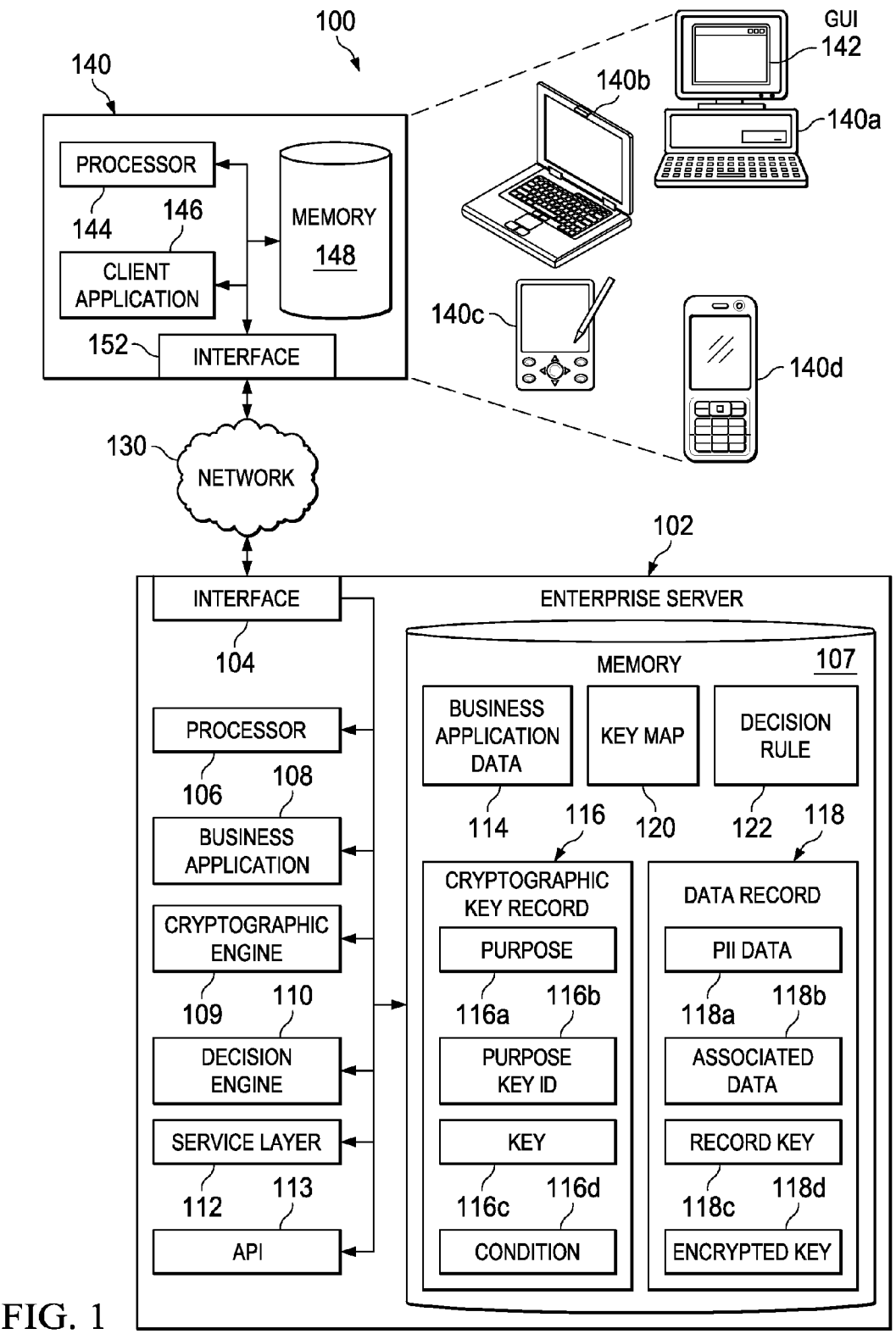
FIG. 1 is a block diagram illustrating an example system for data-protection-compliant deletion of personally identifiable information data.

This disclosure generally describes computer-implemented methods, software, and systems for data-protection-compliant deletion of personally identifiable information.

For the purposes of this disclosure, "personally identifiable information" (PII) data is information capable of use to uniquely identify an individual. In some implementations, an individual may be a person, an organization, a group, and/or business entity. In some implementations, an individual can be a collection of individuals. PII data may also encompass information capable of use to contact or locate the individual or information capable of use with other sources to identify, contact, or locate the individual. Various laws and regulations to address PII data security exist and vary across geo-political boundaries. Examples of PII data could include name, address, telephone number, email address, social security number, passport number, driver license number, session initiation protocol uniform resource identifier (SIP URI), social security number, credit card number, a username, an account name, and/or other suitable data capable of use to identify, contact, and/or locate the individual. In order to permanently disable stored PII data, a cryptographic key or keys encrypting the PII data may be disassociated from the encrypted PII data to make the PII data economically and/or computationally infeasible to recover. Examples of disassociation may include deleting, encrypting, establishing an expiration date, and/or other suitable methods of dissociation related to the cryptographic key or keys encrypting the PII data.

FIG. 1 illustrates an example distributed computing system 100 for data-protection-compliant deletion of PII data. At a high-level, the illustrated example distributed computing system 100 includes or is communicably coupled with an enterprise server 102 and clients 140a-140d (collectively client 140) that communicate across a network 130. The enterprise server 102 comprises a computer operable to receive, transmit, process, store, or manage data and information associated with the example distributed computing system 100. In general, the enterprise server 102 is a server that stores a business application 108, cryptographic engine 109, and a decision engine 110, where at least a portion of the business application 108, cryptographic engine 109, and/or the decision engine 110 is executed using requests and responses sent to a client 140 within and communicably coupled to the illustrated example distributed computing system 100 across network 130. The business application 108, cryptographic engine 109, and/or decision engine 110 are used to ensure data-protection-compliant deletion of PII data. In some implementations, the enterprise server 102 may store a plurality of various business applications 108, cipher engines 109, and/or decision engines 110. In other implementations, the enterprise server 102 may be a dedicated server meant to store and execute only a single business application 108, cryptographic engine 109, and/or a decision engine 110. In still other implementations, the enterprise server can store and execute none, a single instance, and/or a plurality of the business application 108, the cryptographic engine 109, and/or the decision engine 110. In some implementations, the enterprise server 102 may comprise a web server, where the business application 108, cryptographic engine 109, and/or the decision engine 110 represents one or more web-based applications accessed and executed by the client 140 using the network 130 or directly at the enterprise server 102 to perform the programmed tasks or operations of the business application 108, cryptographic engine 109, and/or the decision engine 110.

Specifically, the enterprise server 102 is responsible for receiving application requests, for example requests for data-protection-compliant deletion of PII data, from one or more client applications associated with the client 140 of the example distributed computing system 100 and responding to the received requests by processing said requests in the associated business application 108, cryptographic engine 109, and/or decision engine 110, and sending an appropriate response from the business application 108, cryptographic engine 109, and/or decision engine 110 back to the requesting client application. In addition to requests from the client 140, requests associated with the business application 108, cryptographic engine 109, and/or decision engine 110 may also be sent from internal users, external or third-party customers, other automated applications, as well as any other appropriate entities, individuals, systems, or computers. According to one implementation, enterprise server 102 may also include or be communicably coupled with an e-mail server, a web server, a caching server, a streaming data server, and/or other suitable server. In other implementations, the enterprise server 102 and related functionality may be provided in a cloud-computing environment.

The enterprise server 102 includes an interface 104 Although illustrated as a single interface 104 in FIG. 1, two or more interfaces 104 may be used according to particular needs, desires, or particular implementations of the example distributed computing system 100. The interface 104 is used by the enterprise server 102 for communicating with other systems in a distributed environment—including within the example distributed computing system 100—connected to the network 130; for example, the client 140 as well as other systems communicably coupled to the network 130 (not illustrated). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated example distributed computing system 100.

The enterprise server 102 includes a processor 106. Although illustrated as a single processor 106 in FIG. 1, two or more processors may be used according to particular needs, desires, or particular implementations of the example distributed computing system 100. Generally, the processor 106 executes instructions and manipulates data to perform the operations of the enterprise server 102. Specifically, the processor 106 executes the functionality required to receive and respond to requests from the client 140 and/or ensure data-protection-compliant deletion of PII data.

The enterprise server 102 also includes a memory 107 that holds data for the enterprise server 102. Although illustrated as a single memory 107 in FIG. 1, two or more memories may be used according to particular needs, desires, or particular implementations of the example distributed computing system 100. While memory 107 is illustrated as an integral component of the enterprise server 102, in alternative implementations, memory 107 can be external to the enterprise server 102 and/or the example distributed computing system 100. In some implementations, the memory 107 includes business application data 114, a cryptographic key record 116, a data record 118, and a decision rule 122. Although illustrated as single instances, there may be more than one instance of the business application data 114, the cryptographic key record 116, the data record 118, and the decision rule 122.

The business application data 114 is any type of data associated used by a business application and/or associated with a business objection associated with a business application. For example, for a business application that calculates taxes on sales invoices, business application data for a specific sales invoice data object may include data pertaining to a particular sales invoice number, buyer, seller, date, address, product(s), quantity, price, tax rate, etc.

The cryptographic key record 116 is a record used to associate a particular purpose key 116c with a purpose key identifier (key ID) 116b, a purpose 116a, and one or more conditions 116d. The cryptographic key record 116 includes at least one instance of the purpose 116a, the key ID 116b, the purpose key 116c, and the condition 116d. Turning now to FIG.

2, FIG. 2 is a block diagram illustrating components of a cryptographic key record 116.

The purpose key 116*c* is a cryptographic variable, a unique string of bits used by cryptographic algorithms, for example cryptographic algorithms executed by a cryptographic engine 109, to transform source data, for example plain text, images, audio, video, hashed data, etc., to cipher data and back to source data for a specific purpose 116*a*. Cipher data contains all the information of the source data, but is in an encrypted format not readable by a human or computer without the proper mechanism to decrypt it. Cipher data should resemble random gibberish if attempted to be read. For example, the cipher data form of PII data "John Q. Smith, 4727 Main Street, Big Town, Tex., USA, jqsmith@mydomain.com" could resemble a text string similar to "% QVJshOU$+c8) (#*@%*)MJM@)&#!J2n)($%*Q0@FJ7@#$" if attempted to be read by a human or a computer while encrypted. Generally the size of a key is dependent on the cryptographic algorithm used to generate the cipher data and the strength of the encryption is related to the key size. For example a key of 1024-bits would generally produce a stronger encryption than a 512-bit key; however, depending on the cryptographic algorithm used, the strength of the encryption could be comparatively strong even with different size keys. In some implementations, the cryptographic algorithm used to encrypt or decrypt could be an RSA, Elliptic Curve Cryptographic (ECC), AES, 3DES, Blowfish, or other suitable cryptographic algorithm.

The purpose 116*a* is a justification for a specific purpose key 116*c* used to encrypt PII data. For example, a purpose 116*a* may indicate that, because of a specific law, regulation, etc. that a purpose key 116*c* is to be used to encrypt PII data for a customer that has signed off (i.e., closed) an account at a retailer, in other words a purpose "Customer signed off." The purpose 116*a* can be for any legitimate reason and may include, preserving a tax history, for national security reasons, secure data archiving, etc.

The purpose key ID 116*b* provides a mapping between a purpose 116*a* and a purpose key 116*c*. For example, a customer John Q. Smith decides to close his account (e.g., a sign off event) with a retailer. Consequently, the PII data 118*a* associated with the records detailing John Q. Smith's transactions with the retailer may be required to be encrypted as required and/or motivated by a specific law, regulation, etc. Therefore, a purpose 116*a* of "Customer signed off" is mapped to a generated purpose key 116*c* for customer sign off event using a purpose key ID 116*b*. The purpose key ID 116*b* may then be used in a data record (described below) holding at least John Q. Smith's encrypted PII data (described below) and associated data (described below) to map back to the actual purpose key 116*c* associated with the purpose key ID 116*b* used to encrypt a record key (described below) that encrypts the PII data.

In some implementations, a key map 120 can be used to record one or more mappings, where a mapping describes an association between a purpose key 116*c* in a cryptographic key record 116 used to encrypt the record key associated with a data record 118. In some implementations, the purpose key ID 116*b* is stored in the key map 120. The key map 120 may be a file, database, data structure, or any other suitable method of storing data.

The condition 116*d* is a value, rule, etc. that determines whether a purpose key 116*c* has expired. For example, continuing the prior example, a condition 116*d* may indicate that a purpose key 116*c* used to encrypt a record key associated with a data record 118 holding John Q. Smith's PII data has expired due to reaching a defined termination date associated with the purpose key 116*c* and/or PII data. The termination date could be defined by a requirement in a law, regulation, etc. that PII data be encrypted and held for five years before being discarded. In another example, the condition 116*d* may indicate that the purpose key 116*c* associated with the condition 116*d* and used to encrypt a data record key to store encrypted purchase tax history has expired after 5 years.

Although illustrated as having a single condition 116*d*, in some implementations, a cryptographic key record 116 may have more than one associated condition 116*d*. In these implementations, multiple conditions 116*d* within a cryptographic key record 116 can have a hierarchical relationship where some conditions 116*d* can be deemed subordinate to other superordinate conditions 116*d*.

In some implementations, the hierarchical ordering and/or determination of conditions 116*d* to determine whether the purpose key 116*c* associated with condition(s) 116*d* has expired can be based upon a decision rule 122 used by a decision engine 110 (described below). The decision rule 122 may represent policies, conditions, parameters, variables, algorithms, instructions, constraints, references, and any other appropriate information used by the decision engine 110 to determine whether the purpose key 116*c* associated with conditions 116*d* has expired. For example, a cryptographic key record may have two different conditions 116*d* associated with a purpose key 116*c*. The first condition 116*d* may specify that a purpose key 116*c* used to encrypt a purchase tax history within a data record 118 should expire after five years in the United States of America, but the second condition 116*d* may require that if the State of residence of the originator of the purchase tax history is Texas, the purchase tax history data record 118 should be kept for an additional year (i.e., six years) due to a specific additional State-specific requirement. In this case, if John Q. Smith is a resident of Texas, the decision rule 122 would supersede the subordinate first condition 116*d* due to the more specific, superordinate second condition 116*d* and not indicate that the purpose key 116*c* as expired for another calendar year.

Although shown as integral to the enterprise server 102, in some implementations, the decision rule 122 is stored remotely from the enterprise server 102 as long as the decision rule 122 is accessible by the enterprise server 102. The decision rule 122 may be accessed, for example, using a web service, a remote access system or software, a local or remote client 140, or other suitable system component.

In some implementations, the decision rule 122 can be regularly updated to reflect changes in laws, regulations, rules, corporate policies, etc. A change to the decision rule 122 may trigger an evaluation of all or a portion of available purpose keys 116*c* by the decision engine 110 to determine their expiration status. In this instance, the decision engine 110 can expire one or more purpose keys 116*c* responsive to a determination using the updated decision rule 122 that the one or more purpose keys 116*c* are to be expired.

In some implementations, additional data regarding the creation and/or expiration date, etc. of a purpose key 116*c* can be associated with and/or stored in the cryptographic key record 116 and/or in the key map 120. In other implementations, this data may be associated with and/or stored in any other suitable component of the distributed computing system 100.

Turning now to FIGS. 3A and 3B, FIGS. 3A and 3B are block diagrams 300 illustrating two different implementations of data records 118 each storing PII data 118*a* as described above encrypted with a record key 118*c* (the record key 118*c* encrypted by at least one purpose key 116*c* identified by a purpose key ID 116*b*) and associated data 118*b*.

The PII data 118a is PII data encrypted by a cryptographic engine using the record key 118c. The record key 118c is a cryptographic key similar to the purpose key 116c as described above. Encrypting the PII data in this manner is similar to placing the PII data 118a into a first vault (encrypting with the record key 118c), and then placing key/combination (the record key 118c) to unlock the first vault into a second vault (encrypting the record key 118c with a purpose key 116c) with one or more available keys/combinations (the purpose key 116c) to open the second vault.

The associated data 118b is PII data 118a-associated non-PII data associated with an individual. For example, for a business transaction to purchase a product, say a book, associated data 118c could be any non-PII transaction data associated with the purchase, including the book title, the date purchased, the purchase price, the seller, the general shipping location (i.e., country, city, and/or state), shipping method, etc. Associated data 118b may also itself be protected due to privacy concerns. For example, if the individual would prefer that their purchase of the book remain confidential, the associated data 118c corresponding to the purchased book could be protected in another manner apart from the method used to protect the PII data 118a. In some implementations, part or all of the associated data 118c could also be protected as part of or separately from the PII data 118a using the methods, software, and systems described herein to protect the PII data 118a or other suitable methods, software, and systems consistent with this disclosure.

The encrypted key 118d is an encrypted form of the record key 118c. The record key 118c is encrypted by one or more purpose keys 116c to enhance security of the record key 118c and PII data 118a encrypted by the record key 118c. Thus, the encrypted key 118d is an encrypted form of the record key 118c.

Turning now to FIG. 3A, FIG. 3A is a block diagram illustrating components of data record 118 associated with Record 1 302a. PII data 118a is shown encrypted using KRecord1 record key 118c associated with Record 1 302a. The associated data 118b is shown stored within Record 1 in a non-encrypted format. KRecord1 is also shown encrypted by additional purpose keys 116c KPurpose2, . . . , KPurposeN at 304a and 306a, respectively. In this implementation, the PII data 118a as part of Record 1 302a could be accessed as long as a requestor had access to any of the many KPurpose1, KPurpose2, . . . , KPurposeN purpose keys 116c. In some implementations, each KPurposeN purpose key 116c provides an equivalent access point to decrypt the KRecord1 record key 118c and then subsequently to the PII data 118a.

Turning now to FIG. 3B, FIG. 3B is a block diagram illustrating components of an alternative data record 118 associated with Record 1 302b. PII data 118a is shown encrypted using KRecord1 record key 118c associated with Record 1 302b. The associated data 118b is shown stored within Record 1 302b in a non-encrypted format. In this implementation, the encrypted key KRecord1 at 118c ($E_1$) is shown further encrypted with KPurpose2 purpose key 116c at 304b ($E_2$), then encrypted with KPurpose3 purpose key 116c at 306b ($E_3$), and finally encrypted using KPurposeN purpose key 116c at 308b ($E_N$). This implementation is a multi-layered encryption scheme providing many additional benefits as should be apparent to one of skill in the art. For example, the multiple-layered encryption allows purpose keys 118c to be allocated based on a hierarchical basis, for example for levels of permission, security, importance, etc. This multi-layered approach also enhances security. If, for example, the KPurpose3 purpose key 116c was compromised, the KPurpose2 purpose key 116c could be discarded and recreated along with re-encrypting $E_1$ at 118c. This would prevent the holder of the KPurpose3 or "lower" purpose key 116c to decrypt any "higher" purpose keys 116c, the KRecord1 record key 118c, and the PII data 118a.

As will be apparent to one of skill in the art, FIGS. 3A and 3B are only representative examples of and illustrate only two of many possible implementations of data records 118 and are not meant to limit in any way appropriate functionality or information that may be made available to an enterprise server 102 user. Various encryption configurations, ordering, and hierarchical arrangement are possible offering various security benefits consistent with this disclosure.

The business application 108 is any type of application or set of applications that allows the requesting, viewing, executing, changing, deleting, generating, or otherwise managing information associated with a business. Generally a business application 108 is used by business users to perform various business-related functions to increase productivity, measure productivity, and perform business functions accurately. Example business applications 108 may include human resources management, payroll management, invoicing, business process development/management, etc. In some implementations, the business application 108 can use business application data 114, cryptographic key records 116, data records 118, key maps 120, decision rules 122, and/or any other suitable data associated with the enterprise server 102 and/or other component(s) of the example distributed computing system 100.

Once a particular business application 108 is launched, a client 140 may interactively process a task, event, or other information associated with the enterprise server 102. Business application 108 managed business processes may also include business processes performing and executing business process-related events. Generally, business processes communicate with clients 140, applications, systems, and components to send and receive events.

In some implementations, a particular business application 108 may operate in response to and in connection with at least one request received from other business applications 108, including a business application 108 associated with another enterprise server 102. In some implementations, the business application 108 can be and/or can include a web browser. In some implementations, each business application 108 can represent a web-based application accessed and executed by remote clients 140 across the network 130 (e.g., through the Internet, or using at least one cloud-based service associated with the business application 108). For example, a portion of a particular business application 108 may be a web service associated with the business application 108 that is remotely called, while another portion of the business application 108 may be an interface object or agent bundled for processing at a remote client 140.

Any or all of a particular business application 108 may be a child or sub-module of another software module or enterprise application (not illustrated) without departing from the scope of this disclosure. Still further, all or portions of the particular business application 108 may be executed or accessed by a user working directly at the enterprise server 102, as well as remotely at a corresponding client 140. Further, although illustrated as a single business application 108, the business application 108 may be implemented as multiple business applications 108 on the enterprise server 102.

The cryptographic engine 109 is a service or a stand-alone application that, using a cryptographic algorithm generates cipher, decrypts cipher data, and/or generates digital signatures and signcrypted messages. This cryptographic engine 109 may provide symmetric key cryptographic algorithms as well as asymmetric key cryptographic algorithms. In some implementations, the inputs to the cryptographic engine 109 can include data and a purpose key 116c/record key 118c. In some implementations, data can include PII data 118a, a purpose key 116c, and/or a record key 118c to be encrypted. Outputs may include cipher data and information used to identify the cipher data. The cryptographic engine 109 uses one or more purpose keys 116c/record keys 118c to encrypt/decrypt the data/cipher data, respectively. Most cryptographic algorithms used by cryptographic engines 109 can be categorized in several ways: 1) whether the cryptographic algorithm works on blocks of symbols usually of a fixed size (i.e., a block cipher), or on a continuous stream of symbols (i.e., a stream cipher); 2) whether the same key is used for both encryption/decryption (i.e., symmetric key) or a different key is used for encryption/decryption (asymmetric key). For symmetric key cryptographic algorithms, the key must be known to the recipient and sender and be kept private to ensure confidentiality. For asymmetric key cryptographic algorithms, the encryption/decryption keys are different from each other, one key cannot be deduced from the other, and one of the keys may be made public without loss of confidentiality (public/private key property). In some implementations, the cryptographic engine 109 can use symmetric key cryptographic algorithms. In other implementations, the cryptographic engine 109 can use asymmetric key cryptographic algorithms. In still other implementations, the cryptographic engine 109 can use a combination of both symmetric and asymmetric key cryptographic algorithms. In still other implementations, any suitable cryptographic algorithm can be used by the cryptographic engine 109 as long as it in economically infeasible to attempt to decrypt the resulting cipher data without the associated key(s) used to encrypt the data. "Economically infeasible" may mean that the time and effort required to recover the data from the cipher data is unrealistically high or such that the benefits of inventing the time, effort, and resources needed are significantly lower than the cost incurred.

The decision engine 110 is a service or stand-alone application that determines, using at least the decision rule 122 and one or more conditions 116d associated with a cryptographic key record 116 whether the purpose key 116c associated with the cryptographic key record 116 has expired. Although illustrated as a single decision engine 110 in the enterprise server 102, two or more decision engines 110 may be used in the enterprise server 102 according to particular needs, desires, or particular implementations of example distributed computing system 100. The decision engine 110 can be any application, program, module, process, or other software that may provide methods and a graphical user interface to create, store, and evaluate at least one decision rule 122 and/or condition 116d. In some implementations, a particular decision engine 110 can operate in response to and in connection with at least one request received from an associated business application 108, cryptographic engine 109, and/or client 140. Additionally, a particular decision engine 110 may operate in response to and in connection with at least one request received from other business applications 108, decision engines 110 and/or other cryptographic engines 109, including business applications 108, decision engines 110 and/or cryptographic engines 108 associated with another enterprise server 102. In some implementations, each decision engine 110 can represent a web-based application accessed and executed by remote clients 140 using the network 130 (e.g., through the Internet, or using at least one cloud-based service associated with the decision engine 110). For example, a portion of a particular decision engine 110 may be a web service associated with a decision engine 110 that is remotely called, while another portion of the particular decision engine 110 may be an interface object or agent bundled for processing at a remote client 140. Moreover, any or all of a particular decision engine 110 may be a child or sub-module of another software module or enterprise application (not illustrated) without departing from the scope of this disclosure. Still further, portions of the particular decision engine 110 may be executed or accessed by a user working directly at the enterprise server 102, as well as remotely at a corresponding client 140.

The enterprise server 102 further includes a service layer 112. The service layer 112 provides software services to the example distributed computing system 100. The functionality of the enterprise server 102 may be accessible for all service consumers using this service layer. For example, in one implementation, the client 140 can utilize service layer 112 to communicate with the business application 108, encryption/decryption engine 109, and/or the decision engine 110. Software services provide reusable, defined business functionalities through a defined interface. For example, the interface may be software written in JAVA, C++, or other suitable language providing data in extensible markup language (XML) format or other suitable format. While illustrated as an integrated component of the enterprise server 102 in the example distributed computing system 100, alternative implementations may illustrate the service layer 112 as a stand-alone component in relation to other components of the example distributed computing system 100. Moreover, any or all parts of the service layer 112 may be implemented as child or sub-modules of another software module, enterprise application, or hardware module without departing from the scope of this disclosure.

The enterprise server 102 further includes an application programming interface (API) 113. In some implementations, the API 113 can be used to interface between the business application 108 and/or one or more components of the enterprise server 102 or other components of the example distributed computing system 100, both hardware and software. For example, in one implementation, the business application 108 can utilize API 113 to communicate with the cryptographic engine 109, the decision engine 110, and/or the client 140. The API 113 may include specifications for routines, data structures, and object classes. The API 113 may be either computer language independent or dependent and refer to a complete interface, a single function, or even a set of APIs. While illustrated as an integrated component of the enterprise server 102 in the example distributed computing system 100, alternative implementations may illustrate the API 113 as a stand-alone component in relation to other components of the example distributed computing system 100. Moreover, any or all parts of the API 113 may be implemented as child or sub-modules of another software module, enterprise application, or hardware module without departing from the scope of this disclosure.

The client 140 may be any computing device operable to connect to or communicate with at least the enterprise server 102 using the network 130. In general, the client 140 comprises a computer operable to receive, transmit, process, and store any appropriate data associated with the example distributed computing system 100.

The illustrated client 140 further includes a client application 146. The client application 146 is any type of application that allows the client 140 to request and view content on the client 140. In some implementations, the client application 146 can be and/or include a web browser. In some implementations, the client-application 146 can use parameters, metadata, and other information received at launch to access a particular set of data from the server 102. Once a particular client application 146 is launched, a user may interactively process a task, event, or other information associated with the business suite server 102. Further, although illustrated as a single client application 146, the client application 146 may be implemented as multiple client applications in the client 140.

The illustrated client 140 further includes an interface 152, a processor 144, and a memory 148. The interface 152 is used by the client 140 for communicating with other systems in a distributed environment—including within the example distributed computing system 100—connected to the network 130; for example, the enterprise server 102 as well as other systems communicably coupled to the network 130 (not illustrated). The interface 152 may also be consistent with the above-described interface 104 of the enterprise server 102 or other interfaces within the example distributed computing system 100. The processor 144 may be consistent with the above-described processor 106 of the enterprise server 102 or other processors within the example distributed computing system 100. Specifically, the processor 144 executes instructions and manipulates data to perform the operations of the client 140, including the functionality required to send requests to the enterprise server 102 and to receive and process responses from the enterprise server 102. The memory 148 may be consistent with the above-described memory 107 of the enterprise server 102 or other memories within the example distributed computing system 100 but storing objects and/or data associated with the purposes of the client 140.

Further, the illustrated client 140 includes a GUI 142. The GUI 142 interfaces with at least a portion of the example distributed computing system 100 for any suitable purpose, including generating a visual representation of a web browser. In particular, the GUI 142 may be used to view and navigate various web pages located both internally and externally to the enterprise server 102. Generally, through the GUI 142, an enterprise server 102 user is provided with an efficient and user-friendly presentation of data provided by or communicated within the example distributed computing system 100.

There may be any number of clients 140 associated with, or external to, the example distributed computing system 100. For example, while the illustrated example distributed computing system 100 includes one client 140 communicably coupled to the enterprise server 102 using network 130, alternative implementations of the example distributed computing system 100 may include any number of clients 140 suitable to the purposes of the example distributed computing system 100. Additionally, there may also be one or more additional clients 140 external to the illustrated portion of the example distributed computing system 100 that are capable of interacting with the example distributed computing system 100 using the network 130. Further, the term "client" and "user" may be used interchangeably as appropriate without departing from the scope of this disclosure. Moreover, while the client 140 is described in terms of being used by a single user, this disclosure contemplates that many users may use one computer, or that one user may use multiple computers.

The illustrated client 140 is intended to encompass any computing device such as a desktop computer, laptop/notebook computer, wireless data port, smart phone, personal data assistant (PDA), tablet computing device, one or more processors within these devices, or any other suitable processing device. For example, the client 140 may comprise a computer that includes an input device, such as a keypad, touch screen, or other device that can accept user information, and an output device that conveys information associated with the operation of the enterprise server 102 or the client 140 itself, including digital data, visual information, or a GUI 142, as shown with respect to the client 140.

Turning now to FIG. 4, FIG. 4 is a flow chart 400 for data-protection-compliant deletion of personally identifiable information. For clarity of presentation, the description that follows generally describes method 400 in the context of FIGS. 1, 2, 3A, and 3B. However, it will be understood that method 400 may be performed, for example, by any other suitable system, environment, software, and hardware, or a combination of systems, environments, software, and hardware as appropriate. For example, one or more of the business suite server, the client, or other computing device (not illustrated) can be used to execute method 400 and obtain any data from the memory of the client, the enterprise server, or the other computing device (not illustrated).

At 402, personally-identifiable information (PII) data is encrypted with a first cryptographic key. In some implementations, the first cryptographic key is the record key associated with the data record. From 402, method 400 proceeds to 404

At 404, the encrypted first cryptographic key is encrypted with a second cryptographic key. In some implementations the encrypted first cryptographic key can be encrypted with the second cryptographic key using a different encryption algorithm than that used to encrypt the first cryptographic key. In some implementations, the second cryptographic key is a purpose key associated with a cryptographic key record. From 404, method 400 proceeds to 406.

At 406, the second cryptographic key is analyzed to determine whether a PII data disassociation event has occurred. A PII data disassociation event may include exceeding a chronological retention period deadline associated with the second cryptographic key (i.e., the key is too old), a security alert, a request to destroy the PII data, and/or other suitable PII data disassociation event not inconsistent with this disclosure. In some implementations, one or more conditions associated with the second cryptographic key and/or one or more decision rules are used to perform the analysis. From 406, method 400 proceeds to 408.

At 408, a determination is made whether a PII data disassociation event has occurred. If at 412, it is determined that the PII data disassociation event did not occur, method 400 proceeds to 406. If at 408, however, it is determined that that the PII data disassociation event did occur, method 400 proceeds to 410.

At 410, the PII data is rendered inaccessible by disassociating the second cryptographic key from the encrypted first cryptographic key. In some implementations, disassociating the second cryptographic key from the encrypted first cryptographic key includes permanently erasing the second cryptographic key, expiration of the second cryptographic key due to, for example, a chronological and/or a data value associated with either the PII data or the non-encrypted associated data, or encrypting the second cryptographic key with a third cryptographic key and disassociating the third cryptographic key from the second cryptographic key. From 410, method 400 stops.

Following the disassociation of the second cryptographic key from the encrypted first cryptographic key, the referential integrity of the non-encrypted associated data associated with the encrypted PII data is still preserved although the PII data is inaccessible. For example, associated data related to a purchase transaction for a book may include the book title, the date purchased, the purchase price, the seller, the general shipping location (i.e., country, city, and/or state), shipping method, etc., but PII data associated with the purchaser would be inaccessible. This associated data is useful for metrics type analysis although the specific details concerning the purchaser are unavailable.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program include, by way of example, can be based on general or special purpose microprocessors or both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method, comprising:
    encrypting, by operation of a computer, personally-identifiable information (PII) data using a first cryptographic key, wherein the PII data is associated with non-encrypted associated data, and wherein the first cryptographic key is a record key of a data record storing the PII data;
    encrypting the first cryptographic key with a second cryptographic key, wherein the second cryptographic key is a purpose key associated with a particular purpose providing a justification for the use of the second cryptographic key to encrypt the first cryptographic key, wherein the second cryptographic key is associated with a cryptographic key record used to associate the second cryptographic key with a purpose key identifier, the particular purpose, and one or more conditions, wherein the purpose key identifier provides a mapping between the particular purpose and the second cryptographic key, and wherein the condition determines whether the second cryptographic key has expired;
    determining that the occurrence of a PII data disassociation event associated with the second cryptographic key has occurred; and
    rendering the PII data inaccessible by disassociating the second cryptographic key from the encrypted first cryptographic key.

2. The computer-implemented method of claim 1, further comprising analyzing the second cryptographic key using at least one of a condition associated with the second cryptographic key or a decision rule.

3. The computer-implemented method of claim 1, wherein the PII data disassociation event includes at least one of exceeding a chronological retention period deadline, a security alert, or a PII data destruction request.

4. The computer-implemented method of claim 1, wherein the disassociation of the second cryptographic key from the first cryptographic key is performed by at least one of permanently erasing the second cryptographic key, expiring the second cryptographic key, or encrypting the second cryptographic key with a third cryptographic key.

5. The computer-implemented method of claim 4, wherein the second cryptographic key expires based on a chronological value.

6. The computer-implemented method of claim 4, wherein the second cryptographic key expires based on a data value.

7. The computer-implemented method of claim 1, wherein the disassociation of the second cryptographic key from the encrypted first cryptographic key preserves a referential integrity between the encrypted PII data and the non-encrypted associated data.

8. A computer-program product, comprising computer-readable instructions embodied on tangible, non-transitory, computer-readable media, the instructions operable when executed to perform operations to:
   encrypt personally-identifiable information (PII) data using a first cryptographic key, wherein the PII data is associated with non-encrypted associated data, and wherein the first cryptographic key is a record key of a data record storing the PII data;
   encrypt the first cryptographic key with a second cryptographic key, wherein the second cryptographic key is a purpose key associated with a particular purpose providing a justification for the use of the second cryptographic key to encrypt the first cryptographic key, wherein the second cryptographic key is associated with a cryptographic key record used to associate the second cryptographic key with a purpose key identifier, the particular purpose, and one or more conditions, wherein the purpose key identifier provides a mapping between the particular purpose and the second cryptographic key, and wherein the condition determines whether the second cryptographic key has expired;
   determine that the occurrence of a PII data disassociation event associated with the second cryptographic key has occurred; and
   render the PII data inaccessible by disassociating the second cryptographic key from the encrypted first cryptographic key.

9. The computer-program product of claim 8, further comprising analyzing the second cryptographic key using at least one of a condition associated with the second cryptographic key or a decision rule.

10. The computer-program product of claim 8, wherein the PII data disassociation event includes at least one of exceeding a chronological retention period deadline, a security alert, or a PII data destruction request.

11. The computer-program product of claim 8, wherein the disassociation of the second cryptographic key from the first cryptographic key is performed by at least one of permanently erasing the second cryptographic key, expiring the second cryptographic key, or encrypting the second cryptographic key with a third cryptographic key.

12. The computer-program product of claim 11, wherein the second cryptographic key expires based on a chronological value.

13. The computer-program product of claim 11, wherein the second cryptographic key expires based on a data value.

14. The computer-program product of claim 8, wherein the disassociation of the second cryptographic key from the encrypted first cryptographic key preserves a referential integrity between the encrypted PII data and the non-encrypted associated data.

15. A system, comprising:
   memory operable to store at least personally-identifiable information (PII) data; and
   at least one hardware processor interoperably coupled to the memory and operable to:
   encrypt the PII data using a first cryptographic key, wherein the PII data is associated with non-encrypted associated data, and wherein the first cryptographic key is a record key of a data record storing the PII data;
   encrypt the first cryptographic key with a second cryptographic key, wherein the second cryptographic key is a purpose key associated with a particular purpose providing a justification for the use of the second cryptographic key to encrypt the first cryptographic key, wherein the second cryptographic key is associated with a cryptographic key record used to associate the second cryptographic key with a purpose key identifier, the particular purpose, and one or more conditions, wherein the purpose key identifier provides a mapping between the particular purpose and the second cryptographic key, and wherein the condition determines whether the second cryptographic key has expired;
   determine that the occurrence of a PII data disassociation event associated with the second cryptographic key has occurred; and
   render the PII data inaccessible by disassociating the second cryptographic key from the encrypted first cryptographic key.

16. The system of claim 15, further comprising analyzing the second cryptographic key using at least one of a condition associated with the second cryptographic key or a decision rule.

17. The system of claim 15, wherein the PII data disassociation event includes at least one of exceeding a chronological retention period deadline, a security alert, or a PII data destruction request.

18. The system of claim 15, wherein the disassociation of the second cryptographic key from the first cryptographic key is performed by at least one of permanently erasing the second cryptographic key, expiring the second cryptographic key, or encrypting the second cryptographic key with a third cryptographic key.

19. The system of claim 18, wherein the second cryptographic key expires based on a chronological value.

20. The system of claim 18, wherein the second cryptographic key expires based on a data value.

21. The system of claim 15, wherein the disassociation of the second cryptographic key from the encrypted first cryptographic key preserves a referential integrity between the encrypted PII data and the non-encrypted associated data.

22. A computer-implemented method, comprising:
   encrypting, by operation of a computer, personally-identifiable information (PII) data using a first cryptographic key, wherein the PII data is associated with non-encrypted associated data, and wherein the first cryptographic key is a record key of a data record storing the PII data;
   encrypting the first cryptographic key with a second cryptographic key, wherein the second cryptographic key is a purpose key associated with a particular purpose providing a justification for the use of the second cryptographic key to encrypt the first cryptographic key, wherein the second cryptographic key is associated with a cryptographic key record used to associate the second cryptographic key with a purpose key identifier, the particular purpose, and one or more conditions, wherein the purpose key identifier provides a mapping between the particular purpose and the second cryptographic key, and wherein the condition determines whether the second cryptographic key has expired;
   analyzing the second cryptographic key using at least one of a condition associated with the second cryptographic key or a decision rule;
   determining that the occurrence of a PII data disassociation event associated with the second cryptographic key has occurred, wherein the PII data disassociation event includes at least one of exceeding a chronological retention period deadline, a security alert, or a PII data destruction request; and rendering the PII data inaccessible by disassociating the second cryptographic key from the encrypted first cryptographic key, wherein the disassociation of the second cryptographic key from the first cryptographic key is performed by at least one of permanently erasing the second cryptographic key, expiring the second cryptographic key, or encrypting the second cryptographic key with a third cryptographic key, and wherein the disassociation of the second cryptographic key from the encrypted first cryptographic key preserves a referential integrity between the encrypted PII data and the non-encrypted associated data.

\* \* \* \* \*